July 20, 1948.   C. M. BIRCHER   2,445,556
DRY CELL BATTERY WITH TERMINAL CAP
Filed Aug. 2, 1945

Inventor
Clifford M. Bircher
By Merchant & Merchant
Attorneys

Patented July 20, 1948

2,445,556

UNITED STATES PATENT OFFICE 2,445,556

DRY CELL BATTERY WITH TERMINAL CAP

Clifford M. Bircher, Minneapolis, Minn., assignor to The Malco Company, Incorporated, Minneapolis, Minn., a corporation of Minnesota Application August 2, 1945, Serial No. 608,449

2 Claims. (Cl. 136—135)

My invention relates to dry cell battery construction and more particularly to the provision of a novel terminal carrying cap for such batteries.

One of the objects of my invention is to provide a battery construction which is much easier and more economical to assemble than battery construction heretofore devised.

Another object of my invention is to provide a battery which has a more streamlined effect and pleasing appearance than batteries heretofore constructed.

Another object of my invention is the provision of a battery which has no sharp edges and which can, therefore, be carried by people for use with hearing aids without danger of cutting their clothing.

Another object of my invention is the provision of battery terminals which may be used with prong type connectors with greater accuracy, ease and facility than terminals heretofore used.

The above and other objects of my invention will become apparent from the following specification and the attached drawings.

Referring to the drawings, wherein like characters indicate like parts throughout the several views.

Figure 1:
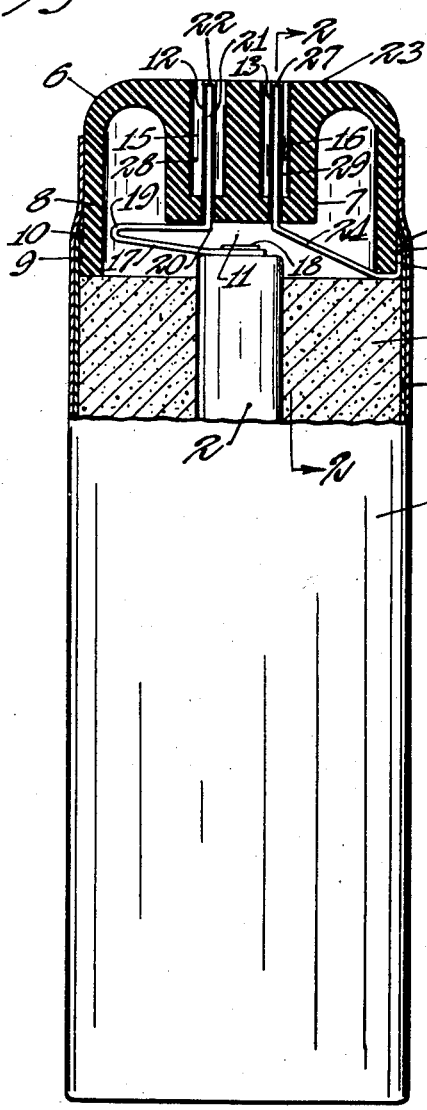
Fig. 1 is a side view, partly in elevation and partly in vertical axial cross section.

Referring with more particularity to the drawings, the numeral 1 indicates a conventional tubular zinc casing or pot forming the negative element of the cell; the numeral 2 the axially disposed carbon, rod-forming positive element; and the numeral 3 the exciting compound. The zinc casing 1 is shown as being encased within a conventional paper tube 4.

It will be observed that the upper end of zinc pot or casing 1 extends upward beyond the exciting compound 3 a slight distance at 5 so as to provide an open end to said casing. Furthermore, carbon rod 2 also extends upwardly a slight distance beyond the exciting compound 3 so as to more readily facilitate the securing of a contact therewith or lead therefrom. An open ended plastic cap 6 made of Bakelite, or other such electrical insulating materials, is telescoped, open end down into the open upper end of the tubular casing or pot 1.

As shown, plastic cap 6 is provided with a head preferably, and as shown, in the form of a central core 7 and a depending annular supporting flange 8. Annular supporting flange 8 rests upon the exciting compound 3 or any interposed packing washer if desired, and is provided at its base with a radially projecting rib or flange 9. The upper edge of tubular casing 1, as shown, extends over rib 9 and is crimped at 10 so as to prevent accidental removal of cap 6 therefrom.

Because the annular supporting flange 8 of cap 6 extends downward a distance considerably greater than the core 7, an open space 11 is provided between the core 2 and the bottom of core 7, the importance of which will hereinafter become apparent.

A pair of preferably parallel narrow slots 12 and 13 are shown as extending axially through said core portion 7 of cap 6. It will be observed that toward their inner ends, slots 12 and 13 are of reduced width at 14 so as to provide a pair of sockets 15 and 16. A contact 17, preferably made from flat strips of Phosphor bronze or the like, is shown as being connected to carbon rod 2 at 18. Contact 17, as shown, is bent in the form of a V 19 which extends substantially radially to the axis of zinc casing 1 within the open space 11 provided between the upper end of carbon rod 2 and core 7 of cap 6. At 20, contact 17 is bent substantially at right angles where it extends upward through the reduced portion 14 of slot 12, and widens out into a bifurcated socket-like prong receiving terminal 21. The tapered upper ends 22 of terminal 21 extend substantially to the upper face 23 of cap 6.

A second contact 24 is shown as having its extreme lower end 25 resting in an upwardly extending notch 26 in rib 9, where it is secured to the zinc casing 1 by means of solder or the like. Contact 24, as shown, extends underneath the lower edge of flange 8 of cap 6 and then upward at approximately a 45° angle to the reduced lower end of slot 12 where it is again bent at approximately a 45° angle, then passes through the reduced opening 14, and widens out in socket 16 to form a bifurcated electrical prong receiving terminal 27.

Figure 2:
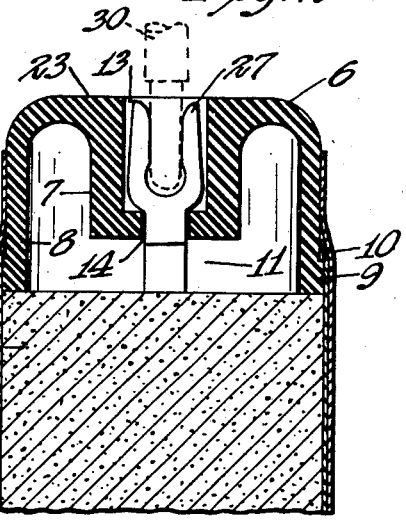
Fig. 2 is a fragmentary cross sectional view taken on the line 2—2 of Fig. 1.
Figure 3:
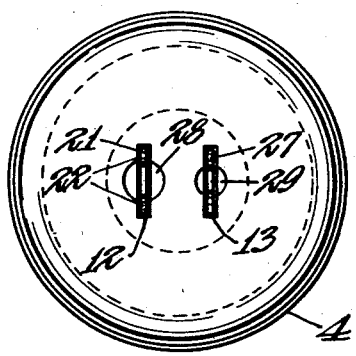
Fig. 3 is a top plan view, some parts being shown in dotted lines.

Slots 12 and 13, as shown particularly in Fig. 3, are bored out round in their centers, as indicated at 28 and 29, in order to receive the elongated cross sectionally round prongs such as indicated in dotted lines by the numeral 30 in Fig. 2.

In assembling my novel terminal-carrying cap to the conventional battery, only the following simple steps are necessary, to wit:

Two socket-like prong receiving terminals such as 21 and 27 are dropped into the vertical slots 12 and 13 in the socket 6 so that their reduced end portions or contacts 17 and 24 project through the reduced lower ends 14, and the terminals 21 and 27 come to rest in the enlarged upper sockets 15 and 16 of slots 12 and 13.

The bottom end of contact 17 is then secured to the top end of carbon rod 2 by means of solder or the like. Thereafter, contact 24 is bent so that its lower end extends under the base edge of supporting flange 8 and has its tip 25 bent upwardly so that it comes to rest in notch 26 in rib 9.

The next step is to telescope the cap 6 into the open end of zinc casing 1 to a point where the radially projecting rib 9 is slightly below the upper open edge of zinc casing 1. This telescoping not only causes contact 17 to take a substantially V-shape position in the open space 11, but also causes the tip 25 of contact 24 to come into tight contact with the inside surface of zinc casing 1. Tip 25 of contact 24 being tinned, it is only necessary to now touch a soldering iron or the like to the outside edge of zinc casing 1 to make tip 25 and casing 1 adhere one to the other.

The final step is the crimping of the extreme upper edge of zinc casing 1 so as to prevent accidental removal of the cap 6. Thereafter, the conventional paper tube 4 may be applied if desired.

While I have shown and described a commercial form of my invention it should be obvious that the same can be changed and modified without departing from the spirit of the appended claims.

What I claim is:

1. In a dry cell battery having a tubular metallic open-ended shell constituting one electrode of the battery, a center pole piece exposed through the said open end of the shell and constituting the other electrode of the battery, a plastic insulating cap telescopically applied to the interior of the open end of said shell, said cap comprising a head which is axially spaced from said center pole piece and a depending annular flange, a pair of parallel slots extending axially through said head, said slots being reduced in width near their lower ends to provide terminal-receiving sockets, electrical terminals in said sockets, a reduced lead extending downwardly through the reduced portion of one of said slots into the space between the core and the center pole piece and thereafter being bent downwardly and outwardly under said flange and terminating in an upturned end in contact with said metallic shell, and a reduced lead extending downwardly through the reduced portion of the other of said slots into the space between the pole piece and the head and connected to said pole piece, said last-mentioned lead being of a length to be secured to said center pole piece when the cap is removed from the open-ended shell and being bent upon itself within the space between the pole piece and the head when said cap is in telescoped position within the shell.

2. The structure defined in claim 1 in which the upturned end of the first-mentioned lead terminates in an upwardly-extending notch in the peripheral surface of the flange of the cap.

CLIFFORD M. BIRCHER.

REFERENCES CITED

The following references are of record in the file of this patent:

UNITED STATES PATENTS

| Number | Name | Date |
| --- | --- | --- |
| 705,919 | Gill | July 29, 1902 |
| 2,036,519 | Fabrey et al. | Apr. 7, 1936 |
| 2,205,878 | Eby | June 25, 1940 |
| 2,225,460 | Porth | Dec. 17, 1940 |
| 2,229,377 | Friang | Jan. 21, 1941 |

FOREIGN PATENTS

| Number | Country | Date |
| --- | --- | --- |
| 387,965 | Great Britain | Feb. 16, 1933 |
| 475,944 | Germany | Feb. 26, 1927 |